S. I. Perry,
Pipe Expander.
N° 29,715. Patented Aug. 21, 1860.
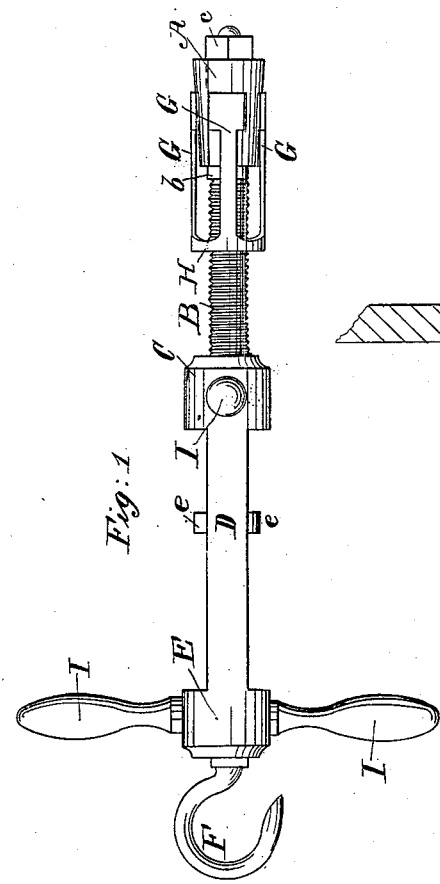
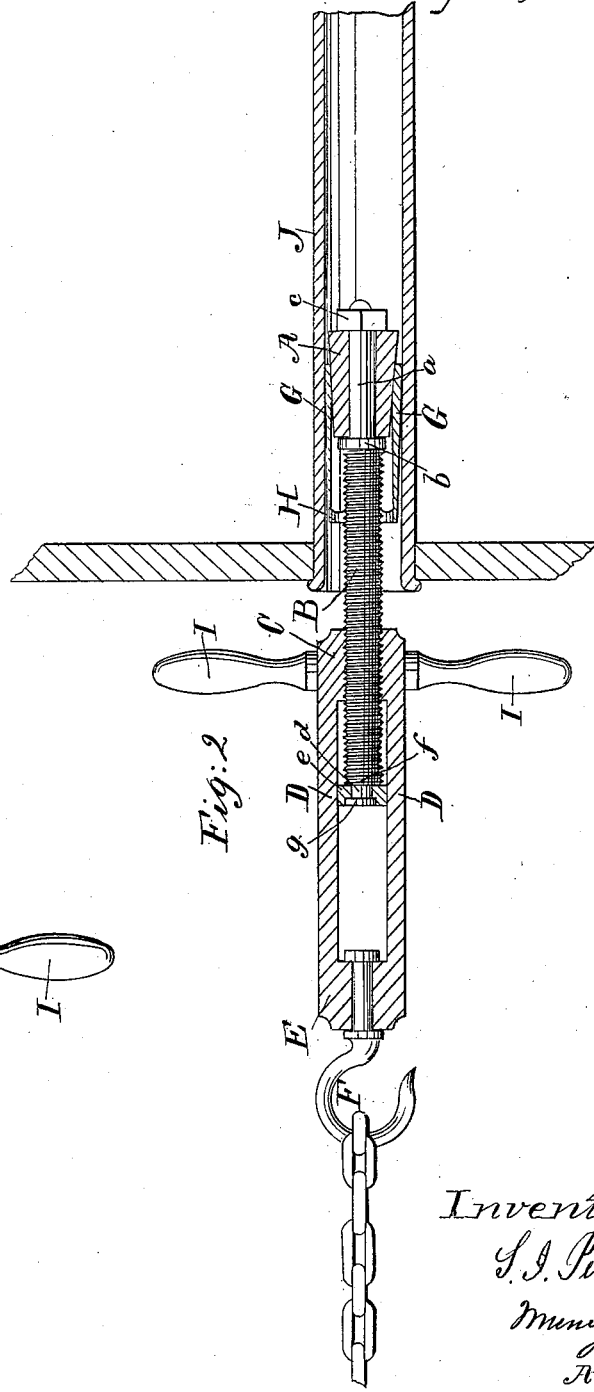
Witnesses;
J. W. Coombs.
R. S. Spence.
Inventor;
S. I. Perry
Munn & Co
Attys

UNITED STATES PATENT OFFICE.

SAMUEL I. PERRY, OF COLUMBIA, SOUTH CAROLINA.

DRAWING BOILER-TUBES.

Specification of Letters Patent No. 29,715, dated August 21, 1860.

*To all whom it may concern:*

Be it known that I, SAMUEL I. PERRY, of Columbia, in the district of Richland and State of South Carolina, have invented a new and useful Instrument for Drawing Out Tubes from Steam-Boilers and other Apparatus; and I do hereby declare that the following is a full, clear, and exact description of the same, reference being had to the accompanying drawings, forming part of this specification, in which—

Figure 1, is a longitudinal outside view of the instrument. Fig. 2 is a longitudinal section of the same exhibiting its application to a tube.

Similar letters of reference indicate corresponding parts in both figures.

This instrument is composed principally of a screw with an attached nut, swivel and cone or circular wedge and a set of connected clamping pieces fitted to the said cone or circular wedge the whole combined and operating as hereinafter specified.

A, is the cone or circular wedge consisting of a piece of cast iron or other metal having its exterior turned truly to the form of a frustrum of a cone the base or larger end of which is smaller than the tubes to be drawn and bored centrally to fit a pivot $a$, that is provided on the end of the screw B, of wrought iron or steel. This screw has a shoulder or collar $b$, in front of the pivot $a$, and has a screw thread cut on the end of the said pivot to receive a nut $c$ between which and the shoulder $b$, the cone A, is secured firmly upon the pivot $a$. At the opposite end of the screw B, there is turned, another pivot $d$, to which is fitted a guide block or slide $e$, which is secured between a shoulder $f$, on the screw and a collar $g$, that is riveted or otherwise secured on the end of the pivot in such a manner that the said guide block or slide is free to turn but not to move longitudinally upon the said pivot.

C, is the principal nut which is fitted to the thread of the screw B, and which has attached to or made in the same piece with it two long parallel rods D, D, which are united at a distance from the screw by a head E, which is bored to receive the pivot like shank of a hook F, or a ring, the said hook F, or ring, head E, and rods D, D, combining to constitute a swivel connected with the nut C, and the guide block or slide $e$, being fitted to slide longitudinally along the rods D, D, but to be compelled to turn round the pivot $d$, and screw B, along with the said rods. The nut C, and head E, are each furnished with arms I, I, to serve as handles to turn the said nut upon the screw B.

G, G, are the clamping pieces three or more in number, consisting of thin strips of steel united by a ring H, large enough to pass loosely over the screw. The said clamping pieces are made flexible or otherwise constructed and attached to the ring H, in such a manner as to be capable of expanding and contracting toward and from the axis of the cone A, to which they are fitted.

The operation of drawing out a tube by this instrument from the sheet or sheets in which it has been placed is as follows. The clamps G, G, are first slipped far enough forward on the cone to permit their insertion into the tube J, along with the cone and the said clamps and cone are then inserted into the tube. The hook F, is then attached by a chain to something which is immovable and the nut C, is turned by the handles I, I, in a direction to run it toward the cone, when the friction of the clamps upon the interior of the tube, and exterior of the cone, prevents the said clamps and the cone and screw from turning, and causes the nut to turn upon the screw and so draw out the screw, thereby making the cone force out the clamps tighter against the tube and draw the clamps and the tube along with the screw toward the hook F. When the end of the screw arrives near the head E, the movement of the nut is reversed by turning the handles in the opposite direction to slacken the chain and run the nut toward the guide block $e$, and the screw is then pushed back into the tube and the cone thereby pushed back within the clamps which become slack within the tube and move back along with the cone. The nut is then again turned in the direction first mentioned and the cone forcing out the clamps against the interior of the tube tightens them therein and draws out the tube still further. The above operation is repeated, the chain being shortened as often as is necessary, till the tube is drawn out.

What I claim as my invention and desire to secure by Letters Patent is—

The instrument composed principally of a screw B, an attached cone or circular wedge A, a set of connected clamps G, G, and a swivel D, E, F, the whole combined and operating substantially as herein specified.

SAMUEL I. PERRY.

Witnesses:
NATHAN MACFIE,
P. BOFILL.